United States Patent Office 3,229,398
Patented Jan. 18, 1966

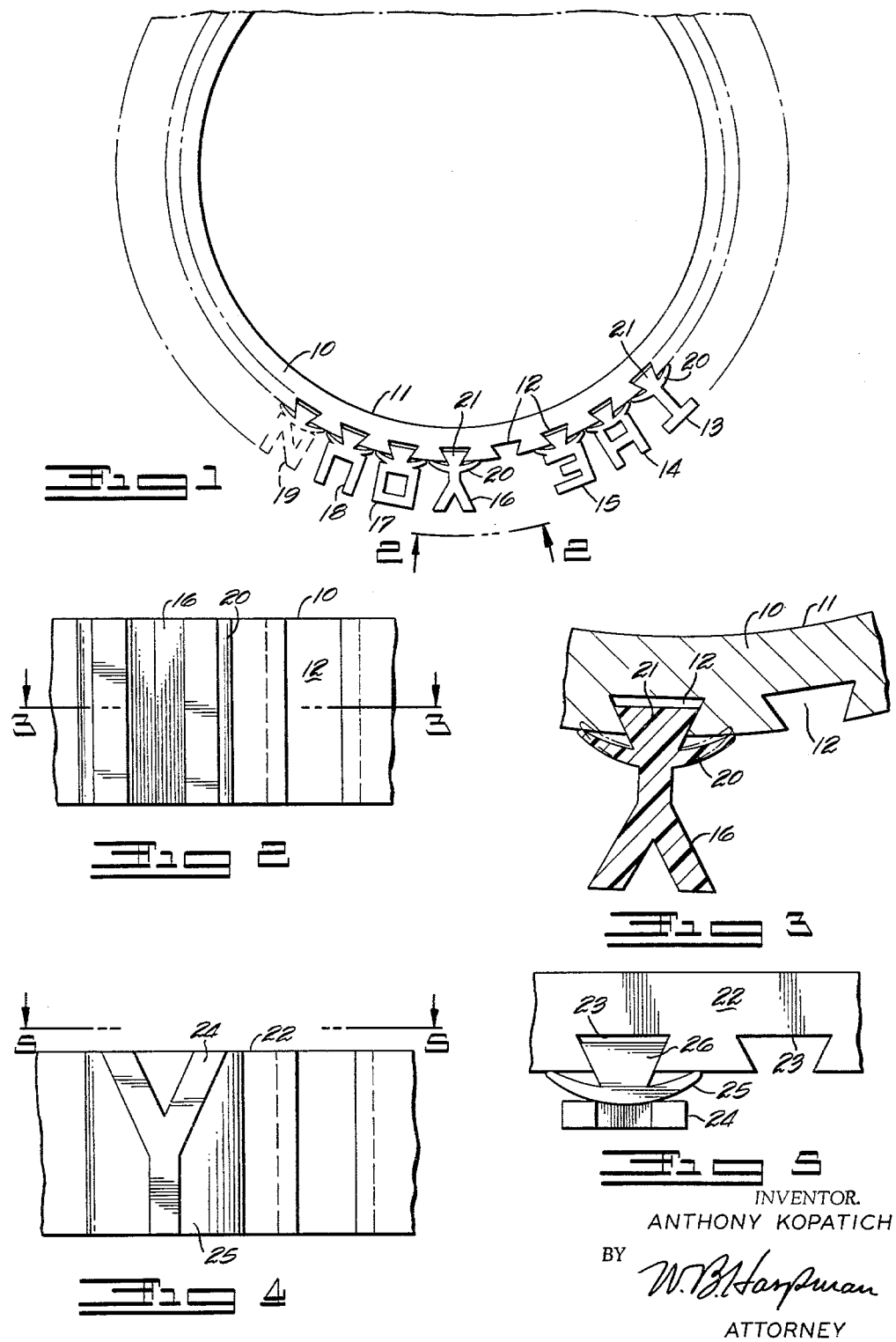

3,229,398
INDICIA MOUNTING MEANS
Anthony Kopatich, 742 Whipple Ave., Campbell, Ohio
Filed May 14, 1964, Ser. No. 367,312
3 Claims. (Cl. 40—140)

This invention relates to indicia such as letters, numerals and the like and more particularly to a novel configuration thereof with means for securing said indicia to a mounting member.

The principal object of the invention is the provision of a combination of a mounting member and indicia having means thereon engaging said mounting member so as to be self-retaining relative thereto.

A further object of the invention is the provision of indicia of novel configuration arranged to slidingly engage registrable formations in a mounting member.

A further object of the invention is the provision of indicia of novel configuration and a mounting member of novel configuration for receiving and holding said indicia in desired relation.

A still further object of the invention is the provision of a means of personalizing objects by affixing initials, numbers, names of the like thereto quickly and inexpensively.

A still further object of the provision of a tubular member having longitudinally extending groove-like configurations in its exterior surface in spaced parallel relation, and a plurality of indicia including numbers, letters and the like, each of which has a novel configuration registering with one of the groove-like configurations of said tubular member so that cut sections of said tubular member and said indicia members may be assembled to form a circular, personally identified member which may support a receptacle or the like.

The invention disclosed herein comprises a simple, efficient and inexpensive means of personalizing such advertising objects and others, as may be desired, by affixing names, dates, numbers or other identifying indicia thereto and, for example, the formation of a personalized ash tray which carries an individual name or a company or corporation name about the periphery thereof and has the appearance of having been formed on a single extrusion die with a section of the extruded material cut off and used as the mounting means for the ash tray.

It has heretofore been customary in the art for extrusion die makers, for example, to produce an extrusion die which is essentially capable of extruding a circular or tubular extrusion, the outer periphery of which is modified by the inclusion of the name and/or address of the extrusion die company. Sections of this extrusion are then cut off and buffed and polished and laid flat upon a desk and serve as a mounting means for a ceramic glass or plastic receptacle and thus comprise a novel and highly attractive commercial ash tray. The extrusion art is relatively new and the average person presented with one of these ash trays or similar article extruded on a complicated and very expensive extrusion die is usually impressed with the article and retains it and it, therefore, maintains its commercial and/or advertising value.

The present invention provides simple and inexpensive means of accomplishing exactly the same results through the use of a single extrusion die by which a tubular member may be extruded and a plurality of individual extrusion dies by means of which extrudable indicia, such as letters and numbers, may be extruded and all of which may then be assembled as desired and in such assembly will provide a replica of the extruded product of the single extrusion die as heretofore referred to.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a top plan view of a portion of a circular mounting member having various individual indicia affixed to the periphery thereof.

FIGURE 2 is an enlarged elevational view on lines 2—2 of FIGURE 1.

FIGURE 3 is a cross section on lines 3—3 of FIGURE 2.

FIGURE 4 is an elevational view of a flat strip of metal or other material showing the application of indicia thereto.

FIGURE 5 is an end elevation taken on lines 5—5 of FIGURE 4.

By referring to the drawings and FIGURES 1, 2 and 3 in particular, a preferred embodiment of the invention may be seen to comprise a circular section of material, such as aluminum, and generally indicated by the numeral 10, and which circular section is a transversely cut portion of a tubular member which is extruded with a smooth inner surface 11 and a plurality of longitudinally extending, spaced parallel dove-tailed grooves 12, 12 on its outer surface. It will occur to those skilled in the art that the diameter of the circular member 10 and/or the tubular member from which it was cut can be any desired size and that there may be as few or as many of the dove-tailed parallel, spaced grooves in its outer surface as desired.

As illustrated in FIGURE 1 of the drawings, a plurality of individual extrusions 13, 14, 15, 16, 17, 18 and 19 are illustrated in end elevation as they would appear if transverse cuts were made therethrough and sections thereof severed therefrom and positioned in engaging relation in the dove-tailed grooves 12, 12 of the circular member 10. By examining each of the individual extrusions 13 through 19, it will be seen that they comprise different letters of the alphabet and that each of the letters is modified so that it has an arcuate base portion 20 and a dove-tail extension 21 thereon. It will thus be clear that in order to form a circular member 10 with individualized names, or numbers, around the periphery thereof, as shown in FIGURE 1, a section of a tubular extrusion is cut transversely thereof to form the circular member 10 with the longitudinally extending, spaced parallel dove-tailed grooves 12, 12 in its outer surface, and a plurality of individual extrusions such as 13 through 19 each of which defines a letter or a number as desired and each of which has an identical base including an arcuate base portion 20 and a dove-tailed portion 21 is then assembled so that the arcuate base 20 is sprung in some slight degree as illustrated in FIGURE 3 of the drawings. In FIGURE 3 broken lines show the original configuration of the arcuate base 20 and solid lines show the sprung or tensioned configuration thereof.

It will occur to those skilled in the art, and particularly the extrusion art, that the arrangement thus provided compensates for the tolerances which are inherent in extruded sections. The dove-tailed extensions 21 on each of the individual indicia which are employed are generally of a loose or sloppy fit with respect to the dove-tailed grooves 12, 12 in the circular member 10 and the spring base 20 compensates for this normal discrepancy and insures that each of the individual indicia sections is securely and properly mounted on the periphery of the circular member 10.

When all of the necessary indicia have been mounted so as to form the desired names, numbers and the like, and it will occur to those skilled in the art that filler strips comprising only the base portions 20 and dove-tailed configurations 21 are used in lieu of spacing elements between words thus formed, the circular member as completed carries the desired name of the company or individual, as the case may be, around its peripheral edges and a receptacle of china, glass, or plastic having a flange as is common is then positioned within the circular member 10 and in abutting relation to the inner wall 11 thereof and with its flange overlying the majority of the dove-tailed grooves 12 and the dove-tailed configurations 21. Thus, when the item is positioned on a desk, it has the appearance of a transverse section cut from a single extrusion with a receptacle suitable for use as an ash tray positioned therein and it therefore possesses a rather high intrinsic value and is capable of being appreciated by the recipient and kept on his desk where it serves its commercial purpose.

In FIGURE 2 of the drawings, an enlarged elevational view of a portion of the assembly as seen in FIGURE 1 may be seen and it will be noted that like numerals in FIGURE 1 are extended to FIGURE 2 to identify the indicia 16 which comprises the letter Y, its arcuate base 20 and its dove-tailed configuration 21.

It will occur to those skilled in the art that modifications of the novel indicia and mounting therefor are possible within the scope of the invention, and by referring to FIGURES 4 and 5 of the drawings, one such modification may be seen. In FIGURES 4 and 5, a section of metal or plastic which is relatively straight and of greater length than its width and thickness is shown with portions of the ends thereof broken away. This section is generally indicated by the numeral 22, and it will be seen that it is provided with a plurality of transversely extending dove-tailed channels 23, 23 therein, which channels are parallel and in spaced relation to one another. It will further be seen that a plurality of indicia having mounting configurations thereon may be mounted one in each of the dove-tailed channels 23.

As illustrated in FIGURES 4 and 5 of the drawings, the indicia comprises the letter Y and it is indicated by the reference numeral 24 and it is mounted on an arcuate base 25, and the arcuate base in turn is directly attached to a dove-tailed extension 26. It will be immediately perceived that the difference between this particular form of the invention and that illustrated and heretofore described in connection with FIGURES 1, 2 and 3 is that the plane of the indicia is now parallel with the mounting base 25, rather than perpendicular thereto.

It will further be observed that sections of extrusions from which the indicia 24 and its essential parts 25 and 26 are formed are simply cut and then slipped sidewardly into the dove-tailed grooves 23 of the longitudinal strip of metal, or other strip of material, 22 so that an attractive indicia carrying arrangement is provided. This may be used as a marker on a flat surface, such as a sign or the like.

It will thus be seen that the indicia and means for mounting the same as disclosed herein meets the several objects of the invention, and having thus described my invention, what I claim is:

1. Indicia and mounting means therefor, said mounting means comprising a body member having spaced parallel undercut grooves therein and said indicia comprising letters, numerals and the like, each of which has a spaced transversely positioned resilient arcuate base member with an axial extension in the form of a fastening configuration registrable with one of said undercut grooves in said mounting member.

2. The indicia mounting means set forth in claim 1 and wherein the mounting member comprises a transversely cut section of a tubular extrusion.

3. The indicia mounting means set forth in claim 1 and wherein the mounting member comprises an elongated flat body member.

References Cited by the Examiner
UNITED STATES PATENTS

| | | | |
|---|---|---|---|
| 533,915 | 2/1895 | Petry | 40—142 X |
| 1,239,983 | 9/1917 | Thunell | 40—142 |
| 1,428,390 | 9/1922 | Moore | 40—142 |
| 1,506,661 | 8/1924 | Pannier | 101—380 |
| 2,056,724 | 10/1936 | Jackson | 20—74 X |
| 2,279,916 | 4/1942 | Del Camp | 20—74 X |
| 2,493,162 | 1/1950 | Olds | 20—74 X |
| 2,596,780 | 5/1952 | Meyers et al. | 20—74 X |
| 2,605,871 | 8/1952 | Kress et al. | 189—88 |
| 2,796,624 | 6/1957 | Speet | 16—16 |
| 2,813,359 | 11/1957 | Ferdinand | 40—16 |
| 2,879,614 | 3/1959 | Baldanza | 40—143 X |
| 2,943,567 | 7/1960 | Pannier | 101—380 |

EUGENE R. CAPOZIO, *Primary Examiner.*

LAWRENCE CHARLES, JEROME SCHNALL,
*Examiners.*

SHELDON M. BENDER, *Assistant Examiner.*